US009940953B1

(12) United States Patent
Zavaliche et al.

(10) Patent No.: US 9,940,953 B1
(45) Date of Patent: Apr. 10, 2018

(54) SI-BASED OVERCOAT FOR HEAT ASSISTED MAGNETIC RECORDING MEDIA

(71) Applicant: Seagate Technology LLC, Cupertino, CA (US)

(72) Inventors: Florin Zavaliche, San Ramon, CA (US); Timothy J. Klemmer, Union City, CA (US); Yukiko Kubota, Campbell, CA (US); Paul M. Jones, Palo Alto, CA (US); Fujian Huang, Palo Alto, CA (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 0 days.

(21) Appl. No.: 15/333,648

(22) Filed: Oct. 25, 2016

(51) Int. Cl.
*G11B 5/72* (2006.01)
*G11B 5/31* (2006.01)
*G11B 5/40* (2006.01)
*G11B 5/00* (2006.01)

(52) U.S. Cl.
CPC ............ *G11B 5/314* (2013.01); *G11B 5/3163* (2013.01); *G11B 5/40* (2013.01); *G11B 2005/0021* (2013.01)

(58) Field of Classification Search
None
See application file for complete search history.

(56) References Cited

U.S. PATENT DOCUMENTS

| | | | |
|---|---|---|---|
| 6,136,421 A | 10/2000 | Chen | |
| 6,381,200 B1 | 4/2002 | Chen | |
| 6,753,072 B1 * | 6/2004 | Chen | G11B 5/66 428/336 |
| 7,758,982 B2 * | 7/2010 | Dai | G11B 5/72 428/800 |
| 7,758,985 B2 | 7/2010 | Dai et al. | |
| 8,043,734 B2 * | 10/2011 | Harkness, IV | G11B 5/72 428/833 |
| 8,582,242 B2 * | 11/2013 | Sonda | G11B 5/3106 360/125.3 |
| 8,687,323 B2 * | 4/2014 | Marchon | G11B 5/722 360/135 |
| 9,263,076 B1 * | 2/2016 | Peng | G11B 5/7325 |
| 2006/0286413 A1 * | 12/2006 | Liu | G11B 5/722 428/829 |
| 2007/0242921 A1 * | 10/2007 | Matsumoto | B82Y 20/00 385/33 |
| 2009/0011169 A1 * | 1/2009 | Fujii | G11B 7/24067 428/64.4 |

(Continued)

OTHER PUBLICATIONS

Sep. 2013, Bunnak et al., "Mechanical Properties of Composite SiNx/DLC Films Prepared by Filtered Cathodic Arc of Graphite Incorporated with RF Sputtering of Silicon Nitride", Materials Sciences and Applications, 2013, 4, pp. 566-571.

(Continued)

*Primary Examiner* — William J Klimowicz
(74) *Attorney, Agent, or Firm* — Hollingsworth Davis, LLC

(57) ABSTRACT

A stack includes a heatsink layer, a magnetic recording layer disposed over the heatsink layer, and a Si-based overcoat layer disposed over the magnetic recording layer. The Si-based overcoat layer is substantially devoid of carbon.

18 Claims, 6 Drawing Sheets

(56) References Cited

U.S. PATENT DOCUMENTS

| | | | |
|---|---|---|---|
| 2011/0032640 A1* | 2/2011 | Marchon | C23C 14/0658 360/122 |
| 2012/0012554 A1* | 1/2012 | Bian | G11B 5/8408 216/22 |
| 2013/0114165 A1* | 5/2013 | Mosendz | G11B 5/65 360/244 |

OTHER PUBLICATIONS

Jun. 2003, Yen et al., "Microstructure and Properties of Ultra-Thin Amorphous Silicon Nitride Protective Coating", Stanford Linear Accelerator Center, Jun. 2003, 36 pages.

Jun. 25, 2014, Yeo et al., "Enhanced tribological, corrosion, and microstructural properties of an ultrathin (<2nm) silicon nitride/carbon bilayer overcoat for high density magnetic storage", ACS Appl Mater Interfaces, Jun. 25, 2014, 6 (12), pp. 9376-9385.

\* cited by examiner

SI-BASED OVERCOAT FOR HEAT ASSISTED MAGNETIC RECORDING MEDIA

SUMMARY

Embodiments discussed herein involve a stack that includes a heatsink layer, a magnetic recording layer disposed over the heatsink layer, and a Si-based overcoat layer disposed over the magnetic recording layer. The Si-based overcoat layer is substantially devoid of carbon.

Some embodiments are directed to a stack that includes a heatsink layer, a magnetic recording layer disposed over the heatsink layer, and an overcoat layer disposed over the magnetic recording layer. The overcoat layer comprises at least one of $SiO_2$ and $Si_xN_y$, wherein the overcoat layer is substantially devoid of carbon.

Further embodiments are directed to a method involving forming a heatsink layer over a substrate, forming a magnetic recording layer over the heatsink layer, and depositing a Si-based overcoat layer over the magnetic recording layer using a SiN target in an environment substantially devoid of carbon. The method can further involve depositing a carbon-based layer over the magnetic recording layer prior to depositing the Si-based overcoat layer.

These and other features and aspects of various embodiments may be understood in view of the following detailed discussion and accompanying drawings.

DETAILED DESCRIPTION

Figure 1:
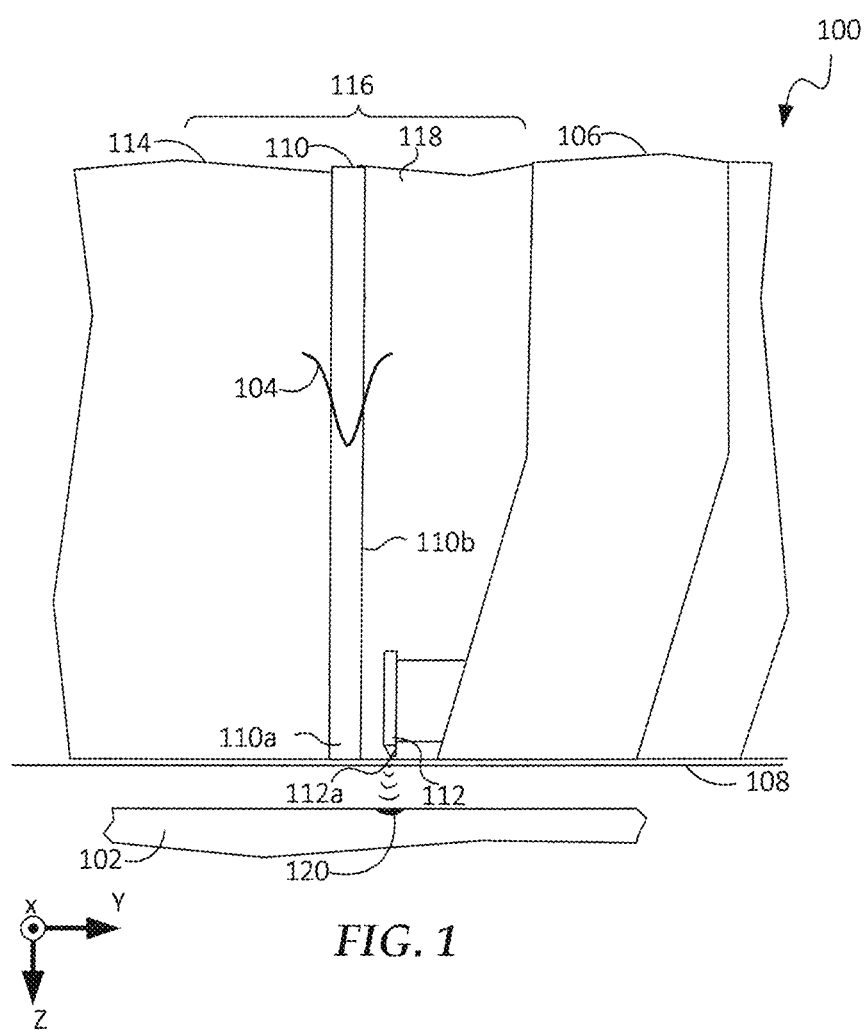
FIG. 1 is a cross-sectional view of a heat assisted magnetic recording system in accordance with embodiments discussed herein.

Heat assisted magnetic recording (HAMR) is a technology that enables areal storage density in hard disk drives well beyond 1 $Tb/in^2$, e.g., to 5 $Tb/in^2$ in theory, using the high magnetocrystalline anisotropy of FePt. The recording process starts by heating a small region of the disk above Curie temperature ($T_c$) using a laser powered near-field plasmonic transducer. The region is subsequently cooled rapidly in the presence of a magnetic field from the recording head. The magnetic field maintains the orientation of magnetization in the local region of heated media as it cools, thereby encoding a bit with data for storage. By reducing the local media anisotropy (K) at high temperature (e.g., above $T_c$), HAMR makes it possible to record data on high anisotropy material such as $L1_0$-FePt. The high anisotropy in $L1_0$-FePt extends the superparamagnetic limit faced with conventional magnetic recording, so that grain size can be further reduced to increase signal-to-noise ratio.

In HAMR, the reading/writing heads accumulate material in the vicinity of the near-field transducer (NFT) during writing operations, e.g., when the laser is operating or in an "on" state. The material accumulates as a smear on the head and can cover various head elements such as sensors like dual-ended temperature coefficient of resistance (DETCR) sensors and the NFT. While buildup of material on a trailing edge or contact pads of the head can be accommodated, accumulation on the media facing surface of the head is believed to impact writing of data and the drive's bit error rate. The accumulation reduces the head-to-media spacing thereby impacting the head flyability over the recording media. This lack of clearance between the head and media results in frictional contact and can cause laser instability due to increasing heat and light reflectivity. In addition, the material accumulation on the media facing surface can reduce the overall hard disk drive lifetime, which is currently approximately three hundred hours, and can reduce manufacturing yields for drives to twenty percent.

The material accumulation is caused, at least in part, by the diamond-like carbon overcoat currently employed on magnetic media to protect the recording media from corrosion, mechanical damage, and to provide a good template for lubricant wetting. In HAMR, the thermo-mechanical stresses during writing operations disrupt the integrity of the carbon overcoat. The media temperature during HAMR writing conditions (typically above 400° C. and more typically approximately 500° C.) exceeds the temperature at which the carbon overcoat transitions to a graphite state for at least one nanosecond and, in combination with the oxygen environment, the carbon forms a gaseous compound ($CO_2$) and ultimately evaporates leading to media overcoat loss. During the carbon overcoat degradation process at temperatures exceeding 300° C. (e.g., 350-400° C.), media material is ablated and/or thermally ejected from the recording media, which then condenses/accumulates on the flying head. Since the writing process involves heating the media facing surface of the recording head, portions of the media facing surface such as on, and around, the NFT expand toward the media. Thus, the material accumulates on the expanded surfaces of the media facing surface. Further, the material can then be smeared back onto the recording medium once the overcoat has softened and degraded.

To reduce and/or eliminate this material accumulation, embodiments described herein are directed to replacing the carbon overcoat with a Si-based overcoat for HAMR recording media. The Si-based overcoat is more thermally stable than the diamond-like carbon overcoat and also acts as a barrier against media corrosion and mechanical damage. The Si-based overcoat can comprise one or more of $Si_xN_y$ (e.g., $Si_3N_4$), $SiNO_x$, and $SiO_2$ and can be doped with various materials. While the Si-based overcoat is substantially devoid of carbon, or essentially a carbon-less layer, the Si-based overcoat can be disposed over, including on, a carbon underlayer to form a bi- or multi-layer overcoat. The various components and configurations for the overcoat layer are discussed in further detail below.

Turning to FIG. 1, a HAMR system is shown in cross-section where laser light is focused on a hot spot 120 on recording media 102, according to an example embodiment. The system includes a write head 100, a laser (not shown), and a HAMR recording medium 102. In this view, an NFT 112 is shown proximate to a surface of magnetic recording medium 102, e.g., a magnetic disk. The NFT 112 includes a peg 112a that extends to the media-facing surface 108. The waveguide system 116 delivers electromagnetic energy 104 (e.g., laser light) to the near-field transducer 112, which directs the energy 104 to create a small hotspot 120 on the recording medium 102. A magnetic write pole 106 causes changes in magnetic flux near the media-facing surface 108 in response to an applied current. Flux from the write pole 106 changes a magnetic orientation of the hotspot 120 as it moves past the write pole 106. The slider body, including the write head 100, moves over the recording medium 102 in a down-track direction (y-direction, e.g., to the left in FIG. 1).

The waveguide system 116 includes a core layer 110 surrounded by cladding layers 114, 118. The core layer 110 and cladding layers 114, 118 may be made from dielectric materials such as $Al_2O_3$, $SiO_xN_y$, $SiO_2$, $Ta_2O_5$, $TiO_2$, ZnS, $SiN_x$, $Nb_2O_5$, AlN, $Hf_2O_3$, $Y_2O_3$, SiC, GaP, Si, etc. Generally, the dielectric materials are selected so that the refractive index of the core layer 110 is higher than refractive indices of the cladding layers 114, 118. This arrangement of materials facilitates efficient propagation of light through the waveguide system 116.

A first end of the core 110 (not shown) extends along the light propagation direction (z-direction) where it is directly or indirectly coupled to a light/energy source (e.g, a laser diode). For example, a laser diode may have an output facet that is coupled face-to-face with an end of the waveguide core 110. In other configurations, optical components such as lenses, mirrors, collimators, mode converters, etc., may be coupled between the waveguide core 110 and the light/energy source. In either case, the energy coupled into the first end of the waveguide core 110 propagates to a second end 110a that is proximate the NFT 112. In this configuration, the NFT 112 is located on a first side 110b of the waveguide core 110. The NFT 112 then generates hot spot 120 on HAMR media 102. The coupling efficiency between the media 102 and the near-field transducer/head can be described as the amount of power needed to heat the media 102 divided by the amount of power needed to energize the near-field transducer 112. Head-media coupling efficiency in HAMR is typically slightly less than seven percent and must be at least one percent.

Figure 2A:
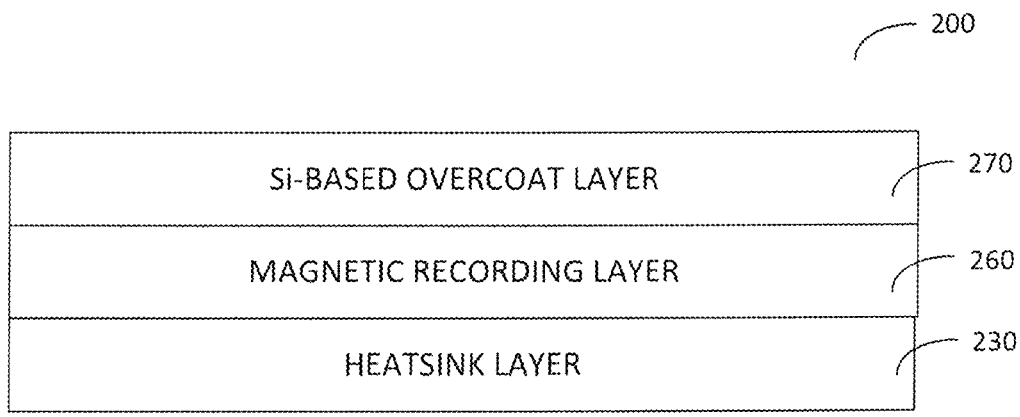
FIGS. 2A-C are cross-sectional diagrams of a magnetic stack in accordance with embodiments discussed herein.
Figure 2B:
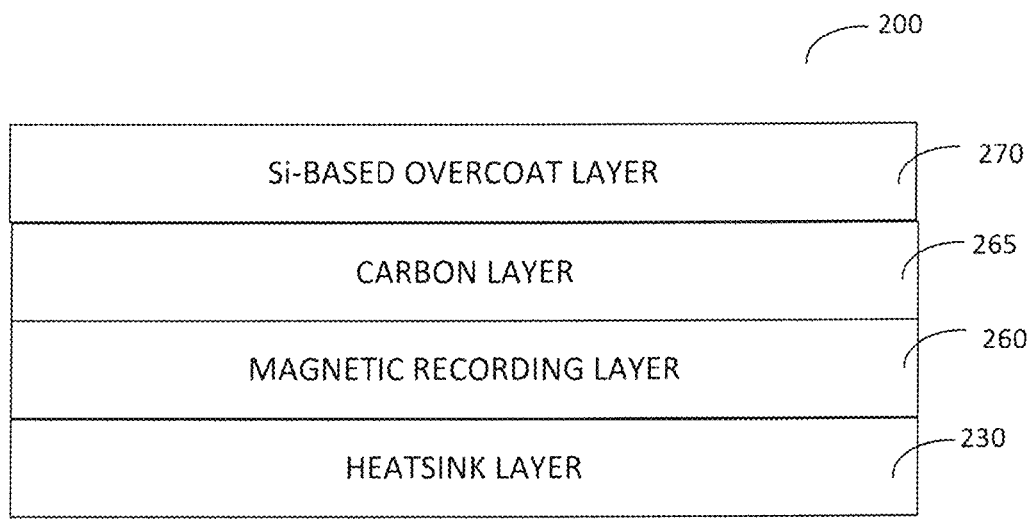
Figure 2C:
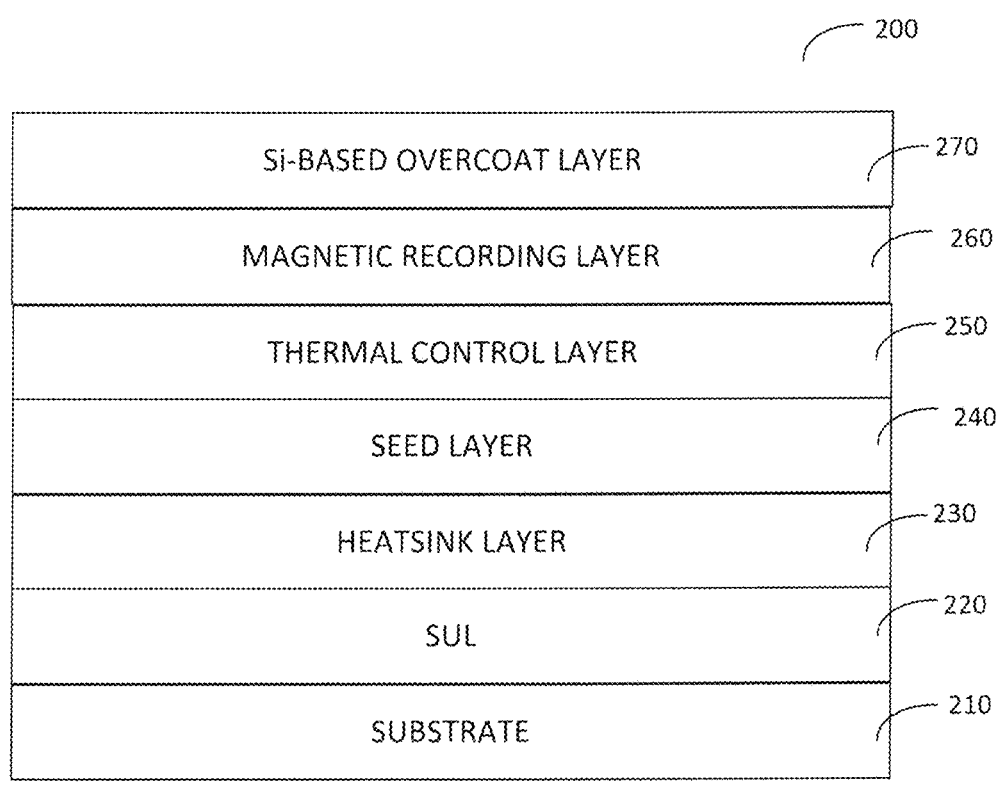

Using approaches described herein, material accumulation on a HAMR head, such as head 100, is reduced or eliminated by altering the overcoat on the magnetic recording medium. In FIGS. 2A-C, a magnetic stack 200 of a recording medium having a Si-based overcoat layer is illustrated. In FIG. 2A, the stack 200 includes a heatsink layer 230 with a magnetic recording layer 260 disposed over the heatsink layer 230 and a Si-based overcoat layer 270 disposed over the magnetic recording layer 260.

Heatsink layers, such as layer 230 are used in HAMR media to facilitate thermal management since the heating of HAMR media has to be powerful enough to reach desired temperatures (at least close to the Curie point, and typically at least 300° C.), but the cooling rate has to be fast enough to avoid thermal destabilization of the written information during the time the media cools down. Both of these issues, efficiency of the heat delivery system and fast cooling rate, are mutually competitive—the faster the cooling rate the more heating power is required to achieve a certain temperature increase. In some configurations, heatsink layer 230 may comprise (200) Cu, Mo, W, Ru, or their alloys such as CuX to dissipate HAMR heat.

Copper (Cu) and/or CuX (e.g., CuX, where X can be any soluble element(s) less than about 50 molecular percent), provides sufficiently high thermal conductivity to be useful for a HAMR heat sink layer. However, layers of Cu and CuX tend to grow in (111) orientation. Magnetic stacks that include (111) heatsink layers 230 may employ one or more additional layers, such as seed layers and thermal control layers, disposed on the heatsink layer 230 that provide or reset the growth orientation for subsequent layers in the magnetic stack, e.g., the magnetic recording layer 260, which are grown over the heatsink layer in (200) orientation for $L1_0$ phases. Having (200) and (111) mixed oriented grains in the Cu based heatsink will induce a significant surface roughness in the film stack and degradation of recoding performance, which is not preferred in a magnetic recording media application.

For surface energy and growth kinetics considerations, body-centered-cubic (BCC) structured heatsink materials, such as Mo and W, are preferably designed with (200) orientations, instead of (110), all the way to the top. Similar to Cu based heatsinks, magnetic stacks that include (200) heatsink layers may employ one or more additional layers deposited on the heatsink layer to provide, or reset, the growth orientation for subsequent layers in the magnetic stack. Mixed oriented grains of (200) and (110) contribute to high media roughness and the degradation of recording performance, which is preferably avoided in magnetic recording media applications.

The magnetic recording layer 260 is disposed over the heatsink layer 230 and may be a granular two-phase layer. The first phase of the magnetic recording layer 260 comprises magnetic grains and the second phase comprises non-magnetic segregant disposed between the grain boundaries of the magnetic grains. The non-magnetic segregant may comprise one or more of C, $ZrO_x$, $TiO_x$, $SiO_x$, $Al_2O_3$, $Si_3N_4$, BN, or another alternative oxide, nitride, boride, or carbide material. Suitable materials for the magnetic grains include, for example FePt, FeXPt alloy, FeXPd alloy, CoPt, CoXPt where X is a dopant. Alternatively, the magnetic recording layer 260 may be a patterned recording layer such as bit-patterned media. Both FIGS. 2A and 2B have a Si-based overcoat layer 270 disposed over the magnetic recording layer 260 (i.e., deposited after the magnetic recording layer).

The Si-based overcoat layer 270 is substantially devoid of carbon to reduce or eliminate material accumulation during writing operations on the recording head. Si-based refers to the overcoat layer comprising one or more of $Si_xN_y$ (e.g., $Si_3N_4$), $SiNO_x$, and $SiO_2$, with or without additional components described further below. A HAMR media overcoat needs to be both thermally and mechanically robust. With respect to thermal properties, the overcoat needs a high melting point to withstand HAMR writing conditions where temperatures exceed at least 300° C. (or exceed the Curie temperature for magnetic recording layer material) at the media surface. Also, the overcoat must be thermally stable so as not to decompose, degrade, or react with the environment under the HAMR writing conditions. With respect to mechanical properties, the overcoat needs to have high atomic density and provide corrosion resistance to protect the recorded data. In addition, the overcoat should be resistant to delamination by having high adhesion to the underlayer(s) when contacting the recording head and provide affinity for an optional lubricant topcoat. Since $Si_xN_y$ has a melting point above 1,000° C. and has hardness twice that of graphitic carbon and comparable to that of diamond-like carbon, $Si_xN_y$ can serve as a protective HAMR media overcoat. The Si-based overcoat 270 layer is approximately 1-3 nm thick, and in certain embodiments, 2-2.5 nm thick.

In addition to $Si_xN_y$, the overcoat layer 270 can be doped with one or more materials to meet recording, mechanical, optical, and thermal performance criteria such as hardness, lube affinity, stability, light absorption, etc. For example, the Si-based overcoat layer 270 can be doped with magnetic semiconductor materials to reduce noise or with plasmonic materials to absorb laser light and improve the coupling efficiency between the media and recording head. The improved coupling efficiency reduces the current used by the laser thereby reducing the head temperature and improving reliability for the recording head. Some example plasmonic materials include elemental plasmonic materials such as silver and gold that may be used to dope the Si-based overcoat layer 270. Further example plasmonic materials include ZrN, TiN, and hyperbolic metamaterials such as TiN/Al$_z$Sc$_{1-z}$N and/or ZrN/Al$_z$Sc$_{1-z}$N, which can be used to dope the Si-based overcoat 270 and/or be layered alternately with SiN layers to form a multi-layered overcoat structure.

Hyperbolic metamaterials, such as TiN/Al$_z$Sc$_{1-z}$N and ZrN/Al$_z$Sc$_{1-z}$N where the amount of Sc is about 10-30% to stabilize the AlN in cubic phase such that z is about 0.7-0.9, are thermally stable nanostructured metal/ceramic composite materials. When embedded in a layer, the layer exhibits an extremely high broad-band photonic density of states at the interface between the metallic and ceramic components of the hyperbolic metamaterial. Hyperbolic metamaterials behave as a metal when light passes through them in one direction and like a dielectric when light passes through in the perpendicular direction—also called extreme anisotropy. The name reflects the fact that the composite material's dispersion relation forms a hyperboloid. The use of nanostructured plasmonic composite materials in close proximity to the magnetic recording layer increases the thermal gradient and head-media coupling efficiency to improve recording performance and reliability. The plasmonic effect of the hyperbolic metamaterial in the overcoat layer can be altered by increasing the volume of the metallic material (e.g., TiN and/or ZrN) in the overcoat layer since that will increase the interface surface area with the insulator material, and the sharp interface between the materials enhances the plasmonic effect. For example, the stoichiometery can be altered based upon the wavelengths emitted by the laser to minimize losses and improve the coupling efficiency.

In alternative embodiments, the Si-based overcoat layer may be combined in a multi-layer structure with an underlying carbon layer, including a SiC layer. FIG. 2B illustrates a stack 200 that is similar in many respects to the stack 200 of FIG. 2A, having a heatsink layer 230, magnetic recording layer 260, and Si-based overcoat layer 270. These layers 230, 260, 270 may have characteristics and materials similar to layers with the same reference numbers described in connection with FIG. 2A. FIG. 2B further includes a carbon layer 265. The carbon layer 265 comprises diamond-like carbon. Even with the presence of carbon layer 265, the Si-based overcoat layer 270 is substantially devoid of carbon such that any minimal amount present is the result of inadvertent interdiffusion of the first few atomic layers in the immediate vicinity of the interface between carbon layer 265 and Si-based overcoat layer 270.

FIG. 2C illustrates a stack 200 that is similar in many respects to the stacks 200 of FIGS. 2A-B, having a heatsink layer 230, magnetic recording layer 260, and Si-based overcoat layer 270. These layers 230, 260, 270 may have characteristics and materials similar to layers with the same reference numbers described in connection with FIGS. 2A-B. FIG. 2C includes additional layers in the recording medium's underlayer such as a substrate 210. The substrate 210 can comprise any variety of materials including, for example, silicon or glass. Also, as discussed above, magnetic stacks that include (111) heatsink layers 230 may employ one or more additional layers, such as seed layer 240 and thermal control layer 250, disposed on the heatsink layer 230 that provide or reset the growth orientation for subsequent layers in the magnetic stack, e.g., the magnetic recording layer 260, which are grown over the heatsink layer in (200) orientation for L1$_0$ phases.

In addition to the substrate 210, the stack 200 can include seed, adhesion, and/or additional layers disposed between the substrate 210 and the heatsink layer 230. For example, an adhesion layer, e.g. a tantalum layer, having a thickness of about 3.5 nm, may be disposed on the substrate 210 to promote adhesion between the substrate 210 and an adjacent layer. The adhesion layer is used to reduce the potential for delamination of the substrate from the rest of the stack. The stack may include a seed layer disposed over the adhesion layer, where the seed layer initiates appropriate growth orientation for the layers above.

The stack 200 can also include a soft magnetic underlayer (SUL) 220 arranged to function as a return path for magnetic flux produced by the magnetic write field during a write operation. The SUL 220 is disposed between the substrate 210 (and seed/adhesion layers, if present) and the heatsink layer 230. The SUL 220 may comprise amorphous and/or nanocrystalline materials may have a thickness of from about 5 nm to about 500 nm, or even 1,000 nm. For example, the SUL 220 may be made of any suitable material such as CoFe, FeCoB, FeAlN, FeAlSi, NiFe, CoZrNb, or FeTaN. The SUL 220 may also comprise laminated structures and/or may comprise antiferromagnetically coupled (AFC) SUL layers. A lubricant layer can optionally overlay the magnetic recording stack 200 being disposed over the Si-based overcoat layer 270.

Figure 3A:
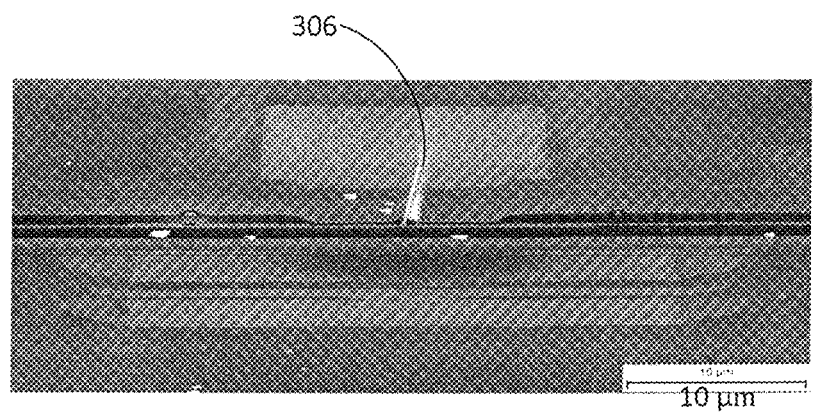
FIGS. 3A-B are atomic force microscopy top views of a heat-assisted magnetic recording head.
Figure 3B:
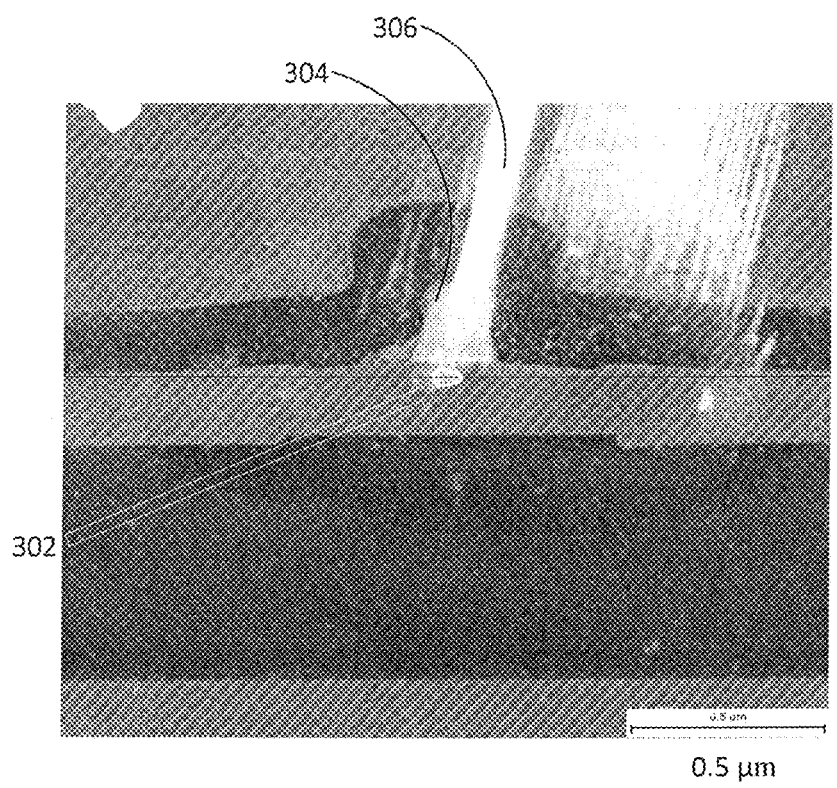

Turning to FIGS. 3A-B, the atomic force microscope images of a HAMR head clearly show material accumulation after writing (e.g., laser "on" state) with media having a carbon overcoat. The image of FIG. 3A has a distance scale bar of ten micrometers and has a smear of material accumulation 306 along with other areas of accumulation, shown as light spots. The image is of the media facing surface of a HAMR recording head. FIG. 3B is a close-up view of FIG. 3A having a comparable scale bar representing a distance of 0.5 micrometers where the write pole 304 and NFT 302 are labeled for orientation. The NFT 302 is indicated with a white circle and arrow pointing thereto. In FIG. 3B, the material accumulation 304 can be seen as concentrated at, and near, the write pole 304.

Figure 4A:
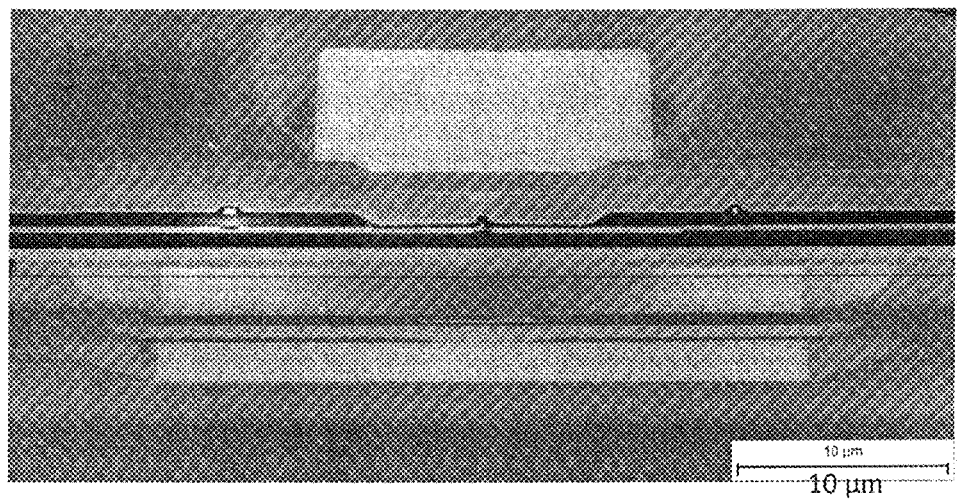
FIGS. 4A-B are atomic force microscopy top views of a heat-assisted magnetic recording head in accordance with embodiments discussed herein.
Figure 4B:
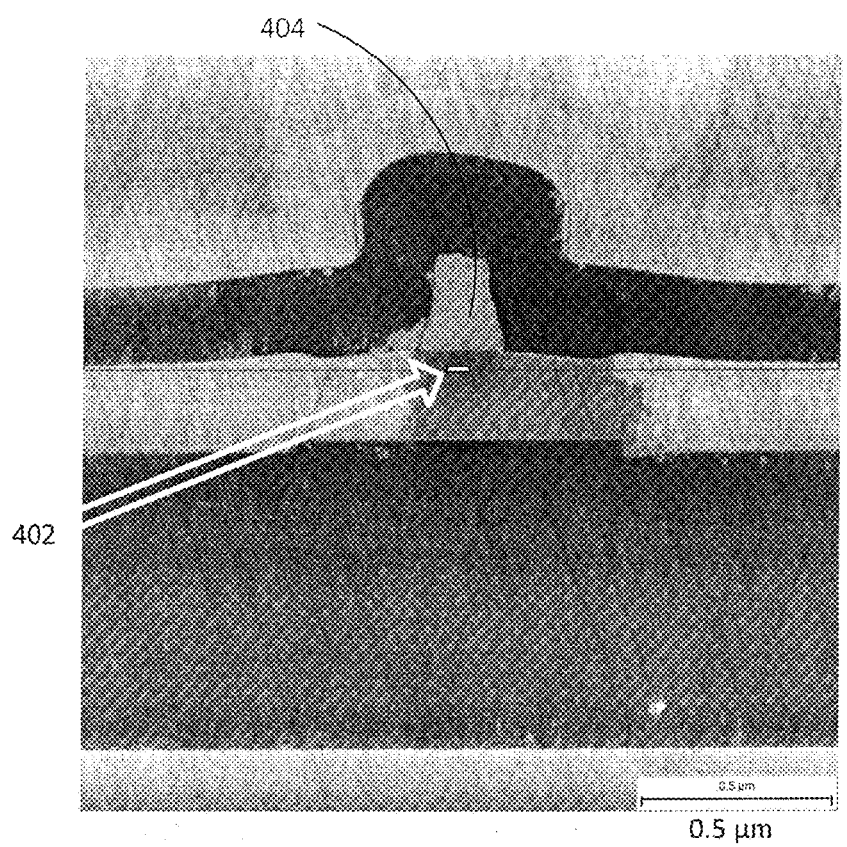

In comparison, FIGS. 4A-B are atomic force microscope images of a HAMR head after writing (e.g., laser "on" state) with media having a Si-based overcoat, as discussed herein. The images notably lack any indication of material accumulation (e.g., no light spots or smears). As above, the image of FIG. 4A has a distance scale bar of ten micrometers, and is of the media facing surface of a HAMR recording head. Again, FIG. 4B is a close-up view of FIG. 4A having a comparable scale bar representing a distance of 0.5 micrometers where the write pole 404 and NFT 402 are labeled for orientation. The NFT 402 is indicated with a white rectangle and arrow pointing thereto. In FIG. 4B, the write pole 404 is clearly visible absent any appreciable material accumulation.

Figure 5:
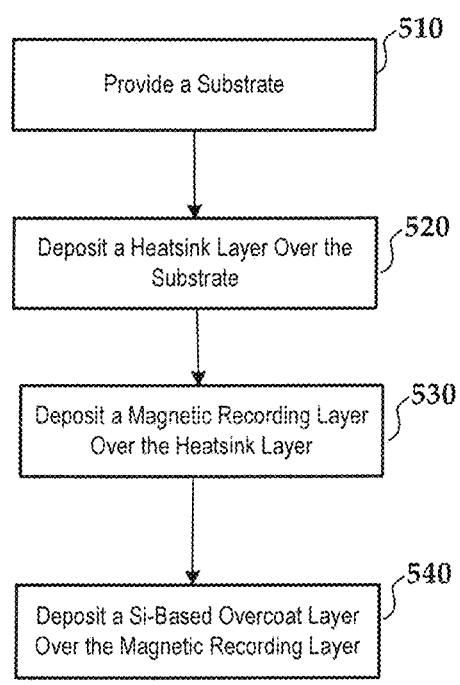
FIG. 5 is a flow diagram illustrating a method of forming a magnetic stack in accordance with embodiments discussed herein.

FIG. 5 is a flow diagram of a process of forming a recording medium in accordance with various embodiments described herein. The recording medium comprises a HAMR magnetic stack including a Si-based overcoat. A substrate is provided 510, and a heatsink layer is deposited over the substrate 520. A magnetic recording layer, e.g., an FePt layer, is deposited over the heatsink layer 530. Optionally, one or more additional layers, e.g., thermal control, adhesion, seedlayers, etc., are disposed over the substrate and/or heatsink layer. Over the magnetic recording layer, a Si-based overcoat layer is deposited 540. Like deposition of the magnetic recording layer, the overcoat layer is deposited with known physical or chemical deposition techniques such as radio frequency (rf) sputtering, direct current (dc) sputtering, reactive magnetron sputtering, chemical vapor deposition, pulsed laser deposition, molecular beam epitaxy, and atomic layer deposition.

In addition to silicon and nitride, the overcoat can be doped with various materials that are also deposited with the above techniques, such as hyperbolic metamaterials, plasmonic materials such as elemental plasmonics, and magnetic semiconductors. The Si-based overcoat layer can be deposited as a single layer, optionally doped with additional materials, or it can be deposited as a multi-layer structure of alternating thin films. For example, one or more bi-layer structures of a $Si_xN_y$ layer adjacent a hyperbolic metamaterial layer (e.g., $TiN/Al_zSc_{1-z}N$ and/or $ZrN/Al_zSc_{1-z}N$) can be stacked to form a multi-layer overcoat layer. In such a bi-layer structure, the hyperbolic metamaterial layer has a granular structure where one material comprises "grains" and the other a "segregant" or matrix material surrounding the grains. In certain embodiments the plasmonic material (e.g., TiN, ZrN) can form the grains while the dielectric material (e.g., $Al_zSc_{1-z}N$) forms the segregant, and in other embodiments, the dielectric material forms the grains with the plasmonic material forming the segregant. The grains can be about 5-10 nm or smaller in diameter such that the layer can also be referred to as a nanocomposite layer. Through sputtering the metallic material and insulating material of the hyperbolic metamaterial layer, the stoichiometry of the hyperbolic metamaterial composite, e.g., the amount of the insulator material and/or its composition, can be altered to enhance the plasmonic effect of the layer within a desired wavelength range. Also, the characteristic grain size of the hyperbolic metamaterial composite layer's nanostructure can be modified to achieve the desired light spot size and enhance the thermal gradients. In further embodiments, the method includes depositing a carbon layer over the magnetic recording layer and prior to depositing the Si-based overcoat layer. The Si-based overcoat layer prevents material from degrading and accumulating on the recording head during writing operations.

It is to be understood that even though numerous characteristics of various embodiments have been set forth in the foregoing description, together with details of the structure and function of various embodiments, this detailed description is illustrative only, and changes may be made in detail, especially in matters of structure and arrangements of parts illustrated by the various embodiments to the full extent indicated by the broad general meaning of the terms in which the appended claims are expressed.

What is claimed is:

1. A stack, comprising:
   a heatsink layer;
   a magnetic recording layer disposed over the heatsink layer; and
   a Si-based overcoat layer disposed over the magnetic recording layer, the Si-based overcoat layer being substantially devoid of carbon and comprising at least one hyperbolic metamaterial.

2. The stack of claim 1, wherein the magnetic recording layer is configured to record data when subjected to heat-assisted magnetic recording writing conditions.

3. The stack of claim 1, further comprising a carbon layer disposed between the magnetic recording layer and the Si-based overcoat layer.

4. The stack of claim 1, wherein the hyperbolic metamaterial comprises $TiN/Al_zSc_{1-z}N$.

5. The stack of claim 1, wherein the hyperbolic metamaterial comprises $ZrN/Al_zSc_{1-z}N$.

6. The stack of claim 1, wherein the Si-based overcoat layer has a thickness in a range of about 1 to 3 nm.

7. The stack of claim 1, wherein the Si-based overcoat layer is a multi-layer structure.

8. The stack of claim 1, wherein the hyperbolic metamaterial comprises $TiN/Al_zSc_{1-z}N$ and $ZrN/Al_zSc_{1-z}N$.

9. A stack, comprising:
   a heatsink layer;
   a magnetic recording layer disposed over the heatsink layer; and
   an overcoat layer disposed over the magnetic recording layer, the overcoat layer comprising at least one of $SiO_2$ and $Si_xN_y$ and comprising at least one hyperbolic metamaterial, wherein the overcoat layer is substantially devoid of carbon.

10. The stack of claim 7, wherein the magnetic recording layer is configured to record data when subjected to heat-assisted magnetic recording writing conditions.

11. The stack of claim 7, further comprising a carbon layer disposed between the magnetic recording layer and the overcoat layer.

12. The stack of claim 9, wherein the hyperbolic metamaterial comprises $TiN/Al_zSc_{1-z}N$.

13. The stack of claim 9, wherein the hyperbolic metamaterial comprises $ZrN/Al_zSc_{1-z}N$.

14. The stack of claim 9, wherein the overcoat layer has a thickness in a range of about 1 to 3 nm.

15. The stack of claim 9, wherein the overcoat layer is a multi-layer structure.

16. The stack of claim 9, wherein the hyperbolic metamaterial comprises $TiN/Al_zSc_{1-z}N$ and $ZrN/Al_zSc_{1-z}N$.

17. A method, comprising:
   forming a heatsink layer over a substrate;
   forming a magnetic recording layer over the heatsink layer;
   depositing a Si-based overcoat layer comprising at least one hyperbolic metamaterial over the magnetic recording layer using a SiN target in an environment substantially devoid of carbon.

18. The method of claim 17, further comprising:
   depositing a carbon-based layer over the magnetic recording layer prior to depositing the Si-based overcoat layer.

* * * * *